United States Patent [19]

Yeack-Scranton et al.

[11] Patent Number: 4,532,802

[45] Date of Patent: Aug. 6, 1985

[54] APPARATUS FOR ANALYZING THE INTERFACE BETWEEN A RECORDING DISK AND A READ-WRITE HEAD

[75] Inventors: Celia E. Yeack-Scranton, South Salem, N.Y.; Siegfried F. Vogel, Los Gatos, Calif.

[73] Assignee: International Business Machines Corporation, Armonk, N.Y.

[21] Appl. No.: 615,638

[22] Filed: May 31, 1984

[51] Int. Cl.³ .................... G01B 5/28; G01N 19/08
[52] U.S. Cl. .................... 73/432 R; 324/212; 360/25
[58] Field of Search ............ 73/7, 105, 432 R, 432 G, 73/432 SD, 432 V, 432 J, 579; 324/110, 112; 360/25, 31

[56] References Cited

U.S. PATENT DOCUMENTS

| 3,683,273 | 8/1972 | Behr et al. | 324/210 |
| 4,416,144 | 11/1983 | Chen et al. | 73/432 V |
| 4,422,322 | 12/1983 | Spangler | 73/105 |
| 4,504,871 | 3/1985 | Berwick | 324/210 |

FOREIGN PATENT DOCUMENTS 0062503  6/1978  Japan ................................ 360/25

Primary Examiner—S. Clement Swisher
Attorney, Agent, or Firm—Graham S. Jones, II

[57] ABSTRACT

A read-write head is provided with a plurality of piezoelectric transducers which produce signals related to its movement as it flies over an adjacently rotating recording disk. By filtering these signals to determine their spectral components in low, medium and high ranges, hard contacts between the head and disk, disk wear or roughness and head movement can be determined.

15 Claims, 7 Drawing Figures

DIRECTION OF DISK MOTION

BELL MODE VIBRATION
200-300 kHz    TIME ⟶

RMS SCUFFING
100-200 kHz    TIME ⟶

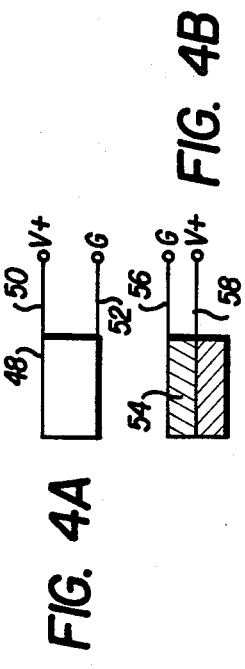
FIG. 3
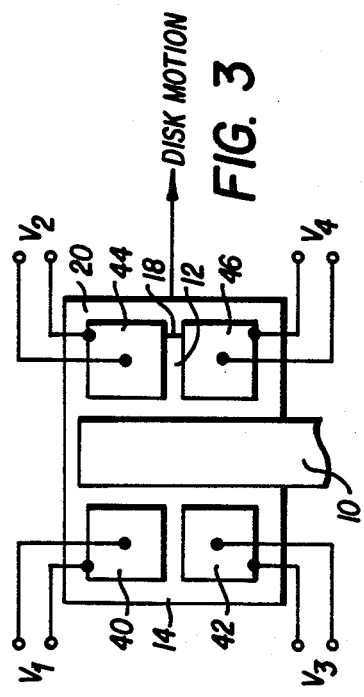
FIG. 4A
FIG. 4B
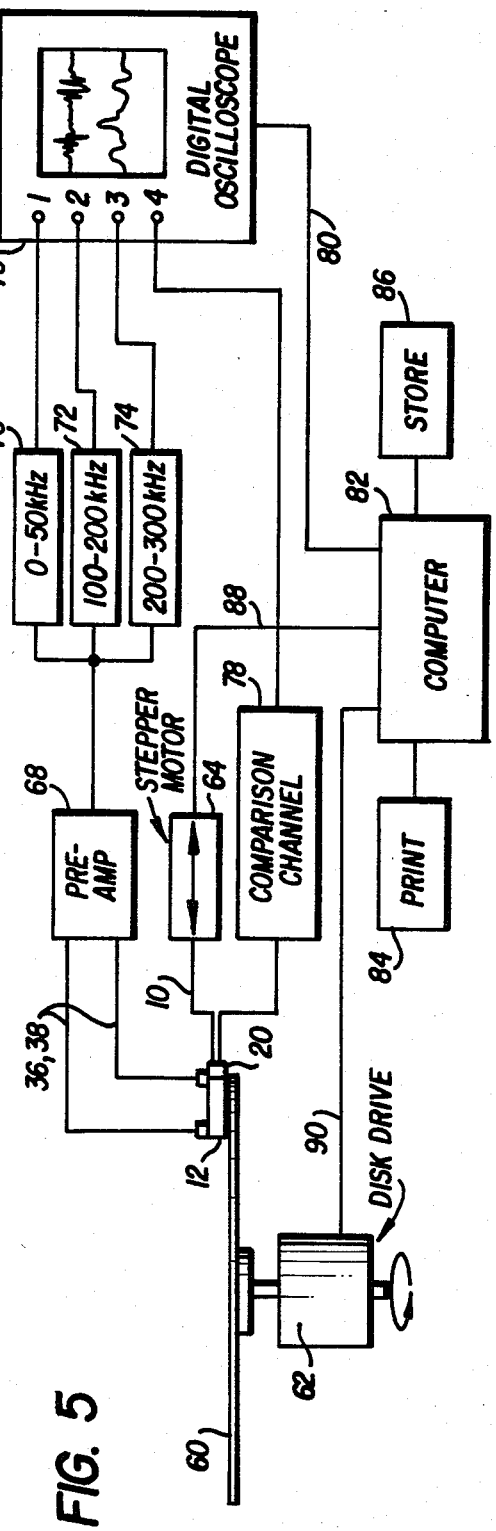
FIG. 5

APPARATUS FOR ANALYZING THE INTERFACE BETWEEN A RECORDING DISK AND A READ-WRITE HEAD

DESCRIPTION

1. Technical Field

The invention is concerned with apparatuses for analyzing relative movement and contact between a rotating recording disk and an associated read-write head. More particularly, the invention is concerned with analyzing the characteristics of the interface between a rotating disk and a read-write head of the type which, during rotation of the disk, is supported adjacent the disk on a thin film of air. Such a read-write head essentially flies over the surface of the recording disk, ideally without contacting the recording disk at any time.

2. Background Art

Read-write heads of this type have found particular application in data processing systems in which the head is used to write data on or read data from an adjacently rotating hard or flexible disk. To prevent damage to either the disk or the read-write head, it has been recognized for a long time that the surface of the disk should be very flat and free of any bumps or the like which might be contacted by the read-write head. Also, the read-write heads have been designed so that they will fly over the surface of the rotating disk at a very small, though theoretically constant distance above the disk, the separation between the read-write head and the disk being maintained by the previously mentioned film of air. During its flight, the head unergoes continuous vibration, pitch and roll as the topography of the disk changes beneath the head. If the quality of the disk or the read-write head is poor, occasional rubbing or sharp contact may occur between the disk and the read-write head, leading to damage to the head or to the disk or loss of valuable data or all of these.

Various attempts have been made to provide increased assurance that such undesirable contact between a read-write head and a recording disk does not occur. Rigid manufacturing and quality assurance specifications for both the recording disk and the read-write head have been instituted. In some instances, such as disclosed in U.S. Pat. No. 3,614,579 granted to Fulton, the read-write head itself has been provided with a piezoelectric transducer for generating a pressurized air film or squeeze bearing between the read-write head and the recording disk, the thickness of the film being essentially constant. Other approaches, such as that disclosed in U.S. Pat. No. 3,713,130 granted to Armer, have involved instrumenting a read-write head with a piezoelectric transducer which will detect impact between the head and the recording disk, the output signal from the transducer being used to generate a warning signal to the operator. U.S. Pat. No. 3,842,663 granted to Harting et al discloses a resonance analysis system for complex machinery in which the resonance of the structure and its transducer is analyzed. U.S. Pat. No. 3,903,733 shows the use of piezoelectric devices for vibration monitoring. The use of magnetoresistive, triboelectric or capacitive transducers for monitoring the dynamic performance of a read-write head has been shown to provide some useful information; however, such transducers typically have a rather poor siganl-to-noise ratio making it difficult to distinguish different phenomena in their output.

Although techniques such as these have helped to ensure the manufacture of high quality disks and read-write heads and to minimize undesirable head to disk contact during use of such devices, a need has continued to exist for an apparatus for analyzing the interface between a given read-write head and a given rotating recording disk to determine both the dynamic characteristics of the movement of the read-write head, and to provide a measurement of the surface condition or quality of the recording disk. Such an apparatus, which is the subject of the present invention, could be used to determine the quality of new or used recording disks and to measure the in-flight performance of new or used read-write heads.

SUMMARY OF THE INVENTION

A primary object of the present invention is to provide an improved apparatus for monitoring and analyzing contact between recording disks and read-write heads during quality assurance testing or normal operation or both.

A further object of the invention is to provide such an apparatus which can be used for monitoring resonant frequencies of the read-write head and its associated support structure over a broad frequency range.

Still another object of the invention is to provide such an apparatus which can be used for monitoring the motion of the read-write head.

Yet another object of the invention is to provide such an apparatus which can be used for relating movement of the read-write head and contact between the read-write head and the recording disk, to deterioration of or variations in the characteristics of the surface of the recording disk.

A still further object of the invention is to provide such an apparatus which can be used for glide height testing of recording disks in which it is desired to kown the number of asperity contacts between the disk and the read-write head above a specified fly height, as well as the disk surface roughness and lube uniformity.

Another object of the invention is to provide a means for end point detection and automatic shut-off in a test environment such as accelerated wear testing, start stop testing and head/disc assembly performance testing.

Still another object of the invention is to provide such an apparatus which can be used for stiction ding testing of recording disks and read-write heads where a sudden strong torque about the gimbal of the support structure for the read-write head may give rise to increases in pitch and roll of the head.

These objects are given only by way of illustrative examples; thus, other desirable objectives and advantages inherently achieved by the disclosed invention may occur or become apparent to those skilled in the art. Nonetheless the scope of the invention is to be limited only by the appended claims.

In its broadest sense, the apparatus according to the invention is useful for analyzing the interface between a recording disk and a read-write head. Transducer means are provided for transforming mechanical movement of the head into representative electrical signals. These signals are analyzed by means for separating the signals into spectral components representative of rigid body acceleration of the head and the roughness of the movement of the head over the surface of the disk. The signals also may be separated into spectral components representative of contacts between the head and the disk, the frequency of these spectral contacts being higher than the frequency of those components representative of the roughness of the movement of the head over the surface of the disk.

In one embodiment of the invention, means are provided for rotating a recording disk. Means, which may be an actual read-write head, are provided for simulating the geometry, weight and material properties of such a head. Means are provided for moving the head to preselected positions across the surface of a rotating recording disk. At least one piezoelectric transducer means, mounted on the head, is used to produce first signals in response to acceleration or flexure or both by the head, due to movement of the head or contact thereof with the rotating disk or both. The signals from the transducer means are selectively filtered to produce second signals in a first relatively low frequency range in which spectral components of the first signals are indicative of rigid body acceleration of the head. Third signals are also produced in a second, relatively high frequency range in which spectral components of the first signals are indicative of contacts between the disks and the head. Finally, the filtering produces fourth signals in a third frequency range below the second frequency range, in which RMS spectral components of the first signals are indicative of the surface condition of the disk as shown by the roughness of flight of the head over the surface of the disk. In the preferred embodiment, the disk is a magnetic recording disk and the head is a magnetic read-write head; however, the invention can also be applied to other types of recording disks and read-write heads in which the head flies above the disk.

In the preferred embodiment of the invention, the head comprises an outer surface which faces away from the disk. On this surface are positioned four piezoelectric transducers, two at spaced locations near the leading edge of the surface during rotation of a disk adjacent to the head, and two positioned at spaced locations near the trailing edge of the surface during such rotation. As a result of this configuration, accelerations of the head can be measured which are indicative of roll and pitch of the head during operation. These measurements also can be used to determine disk run out, disk resonances, air film resonances and the like. In another embodiment of the invention, only two piezoelectric transducers are provided, one on the leading edge and one on the trailing edge so that accelerations indicative of pitch of the head can be detected. In either case, the first resonant frequency of the piezoelectric transducer preferably is above the maximum frequency to be observed.

BRIEF DESCRIPTION OF THE DRAWINGS

The foregoing and other objects, features and advantages of the invention will be apparent from the following more particular description of the preferred embodiment of the invention, as illustrated in the accompanying drawings.

FIG. 3 shows a schematic, plan view of preferred embodiment of a read-write head according to the invention which includes a pair of piezoelectric transducers at each of its leading and trailing edges.

FIG. 4A shows an alternative type of piezoelectric transducer useful in the invention.

FIG. 4B shows a further alternative type of piezoelectric transducer useful in the invention.

FIG. 5 shows a schematic view of a computer controlled system for analyzing the interface between a read-write head and the recording disk in accordance with the invention.

DESCRIPTION OF THE PREFERRED EMBODIMENT

Figure 1:
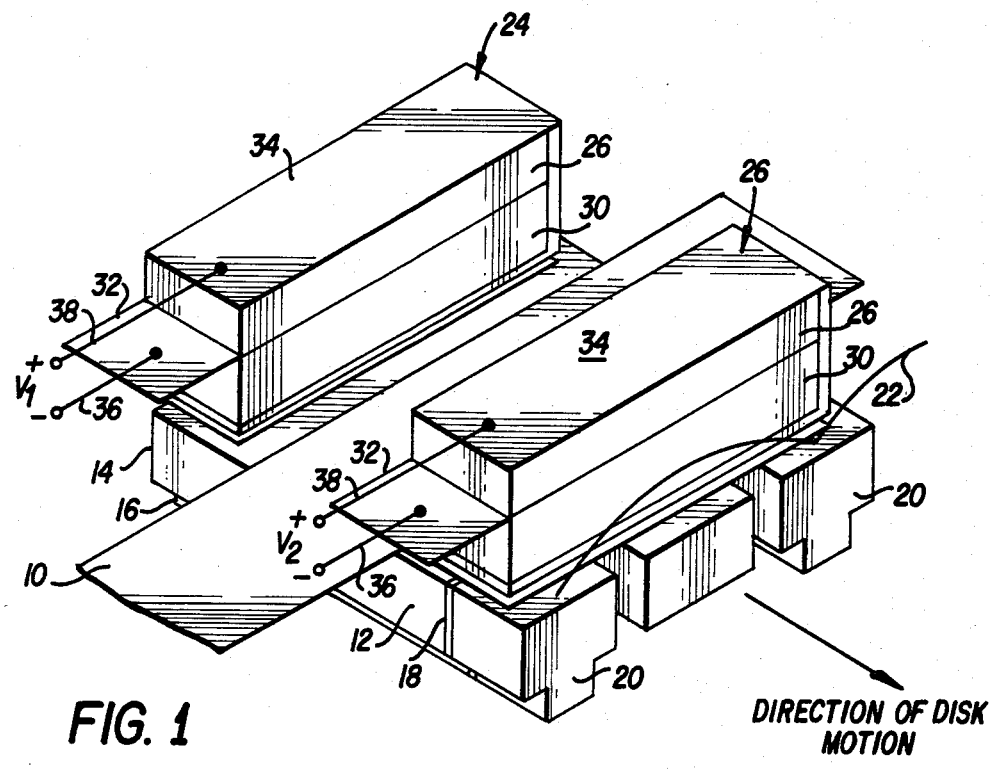
FIG. 1 shows a perspective, fragmentary view of a read-write head according to the invention which comprises piezoelectric transducers on its leading and trailing edges and also a capacitance probe on its trailing edge.

The following is a detailed description of the preferred embodiment of the invention, reference being made to the drawings in which the same reference numerals identify the same elements of structure in each of the several figures.

FIG. 1 shows a perspective view of a read-write head of the type especially suited for use in accordance with the invention. A conventional suspension arm 10, shown fragmentarily, supports a conventional magnetic read-write head 12 having a leading edge 14 when a disk rotates in the direction indicated adjacent to the underside 16 of the head. At the trailing edge 18 of head 12, a previously known head motion detector 20 may be mounted for producing signals useful for comparison to head motion signals produced by the transducers according to the invention. Transducer 20 may be a capacitive device, a magnetoresistive device or a triboelectric device, all of which are known in the art. Leads 22 may be provided for signals from transducer 20.

In accordance with the invention, a leading edge transducer 24 and a trailing edge transducer 26 are bonded to the upper surface of read-write head 12 for measuring its dynamic performance and providing information concerning an adjacently rotating disk. Each of transducers 24,26 may comprise a pair of oppositely poled blocks 28, 30 of piezoelectric material such as lead-zirconate-titanate (PZT). Blocks 28,30 are separated by and intimately glued to an intermediate, negative electrode 32. A wraparound positive electrode 34 extends along the bottom surface, up one end and along the top surface of each transducer. The first self resonance of each transducer 24,26 should be well above the maximum frequency to be observed during use of the apparatus. The transducers are quite small, typically weighing approximately 10 mg. For example, blocks 28,30 may be approximately 3.0 mm long, approximately 1.0 mm wide, and approximately 1.0 mm thick. A pair of fine wire leads 36,38 are attached to electrodes 32,34 so that an output signal $V_1$ is produced at transducer 24 and an output signal $V_2$ is produced at transducer 26.

We have found that for signals having spectral components in the 1–50 kHz range, $V_1$ is proportional to the up and down acceleration of leading edge 14 and $V_2$ is proportional to the up or down acceleration of trailing edge 18. Accordingly, the sum of $V_1$ and $V_2$ is proportional to the net up or down acceleration of read-write head 12. And, the difference between $V_1$ and $V_2$ is proportional to the pitch of read-write head 12 as it flies along above the surface of an underlying recording disk. The components of the signal in the frequency range can also be configured to give a measure of disk run-out, various disk resonances and the air bearing resonances.

Figure 2A:
FIG. 2A shows a trace of the high frequency spectral component of the output signal of the piezoelectric transducers shown in FIG. 1.

In accordance with our invention, the output from either transducer 24 or transducer 26 is filtered to produce its spectral components in the 200–300 kHz range. We have found that in this range sharp contacts with the adjacent recording disk will produce a bell mode vibration occurring at about the mounted resonant frequency of the head and its support structure and having a trace such as shown in FIG. 2A. The number of such transients at a given frequency for a given radial head position is equal to the number of such sharp contacts. This number is an indication of disk quality and also can be used for glide height testing of heads.

Figure 2B:
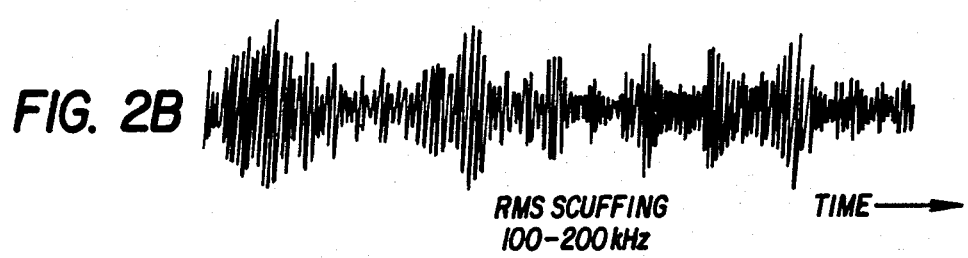
FIG. 2B shows a trace of a somewhat lower frequency RMS signal caused by frequency low level contact between the read-write head and the disk or by surface roughness on the disk.

On the other hand, if the output from either transducer 24 or 26 is filtered to produce its spectral components in the 100–200 kHz range, we have found that in this range the signal from a rough or worn disk will have an increased RMS or base line level as shown in FIG. 2B (relative to a new disk), at points separated in time from sharp contacts of the type shown in FIG. 2A. This RMS level is indicative of frequent low level contact or scuffing between the read-write head and the disk. The magnitude of the disk RMS level can be correlated to surface conditions such as roughness and degree of wear of the disk itself. As the RMS level increases for a given disk, the wear out time for the disk and the likelihood of head crash can be predicted, based on empirical data accumulated for disks for a given type. The magnitude of this RMS level on new disks can also be correlated to insufficient lubrication on the disk since the lubrication tends to smooth out roughness; and to debris pickup on the head.

The RMS signal shown in FIG. 2B appears to arise from several phenomena and, at least at low to mid amplitude RMS, is not associated with the discrete contacts. Very high RMS levels may arise from contacts so numerous that they are spaced less than the length of read-write head 12. One cause of an RMS increase is lubrication pick up from the recording disk on leading edge 14. This lubrication pick up spoils the air bearing surface, causing instabilities and excess vibration. The plate resonances of read-write head 12 are sensitive indications of this type of problem.

FIG. 3 shows a plan view of a read-write head 12 having the preferred configuration of the invention in which four piezoelectric transducers are used. At leading edge 14, transducers 40,42 are positioned at opposite corners of head 12; while at trailing edge 18, transducers 44,46 are positioned at opposite corners. Each such transducer is similar to basic structure to transducers 24, 26 in FIG. 2 though smaller, with length, width and thickness all being about 1.0 mm and weight being about 3.0 mg. The output voltages from leading edge transducers 40,42 are $V_1$ and $V_3$ and from trailing edge transducers 44,46 are $V_2$ and $V_4$. If the output voltages are filtered to the 1–50 kHz range, the net up or down acceleration of read-write head 12 is determined by:

$$A = K_a[(V_1+V_3)+(V_2+V_4)], \quad (1)$$

where $K_a$ is a constant. This is a measure of air bearing and disk runout. The pitch P of read-write head 12 is determined by:

$$P = K_p[(V_1+V_3)-(V_2+V_4)], \quad (2)$$

where $K_p$ is a constant. Finally, the roll R of read-write head 12 is determined by:

$$R = K_r[(V_1+V_2)-(V_3+V_4)], \quad (3)$$

Where $K_r$ is a constant. By examining separately the spectra of the output signals from each transducer, it can be determined which nodes are due to pitch, roll and vertical acceleration, yielding data for comparison to analytical models.

In the 200–300 kHz range, the output from any one of transducers 40–46 can be used to monitor the occurrence of sharp contacts between the head and the disk as indicated by bell mode vibrations of the sort illustrated in FIG. 2A. Similarly in the 100–200 kHz range, the output signal from any one of transducers 40–46 can be used to produce the base line or RMS signal of the sort shown in FIG. 2B to provide an indication of the roughness of the flight of the read-write head over the surface of the disk.

FIGS. 4A and 4B illustrate schematically types of transducers suitable for use in the embodiments of FIGS. 1 and FIG. 2. A unimorph PZT transducer 48 having a pair of electrodes 50,52 or a bimorph PZT transducer 54 having a pair of electrodes 56,58 can be used to measure the movement and flexure of read-write head 12 in the manner previously described.

FIG. 5 shows a schematic view of a computer controlled system particularly useful in accordance with the present invention. A recording disk 60, which may be a hard or flexible disk of the types commonly known, is supported for rotation by a disk drive 62. A stepper motor 64 is provided to move suspension arm 10 and read-write head 12 so that a map can be obtained of characteristics of the disk, its interface with the head and characteristics of the head. The ouptut signals from transducers 24,26 or 40–46 are passed separately to a suitable preamplifier 68 for about 70x amplification, after which they are directed to band pass filters 70,72 and 74 which pass spectral components in the 0–50 kHz, 100–200 kHz and 200–300 kHz ranges, respectively. The outputs of filters 70–74 are directed to a conventional digital oscilloscope 76 where the analog signals are converted to digital form and displayed. For comparison purposes, a suitable signal amplifying and smoothing circuit 78 may be used to adjust the output signal from transducer 20 for simultaneous, parallel display by oscilloscope 76. In some applications of the invention, the apparatus may be manually controlled and the outputs of filters 70–74 can be connected to a recorder or oscilloscope for direct visual analysis at each radial position of head 12 on disk 60. Rather than using band pass filters, Fourier analysis can be applied to generate the desired spectral components of the signals from the piezoelectric transducers.

Preferably, however, the signals in each frequency range are fed separately over a suitable cable 80 to a general purpose digital computer 82 where the information in these signals may be further processed for display on a printer 84 and retention in a storage means 86. To permit analysis of the interface between read-write head 12 and recording disk 60 at a variety of radial locations on the disk, the disk drive 62 and stepper motor 64 may be controlled by computer 82 by means of signals passed over suitable conductors 88 and 90.

While our invention has been shown and described with reference to particular embodiments thereof, those skilled in the art will understand that other variations in the form and detail of the apparatus may be made without departing from the spirit and scope of our invention.

Having thus described our invention in sufficient detail to enable those skilled in the art to make and use it, we claim as new and desire to secure Letters Patent for:

1. An improved apparatus for testing a recording disk for determining its quality, said apparatus comprising:
   means for rotating such a disk;
   means for simulating the geometry, weight and material properties of a read-write head;
   means for moving said means for simulating to preselected positions across the surface of a recording disk while the disk is rotating on said means for rotating, whereby said means for simulating is spaced from the surface of the disk at a specified fly height due to rotation of the disk;
   at least one piezoelectric transducer means, mounted on said means for simulating, for producing first signals in response to acceleration or flexure or both by said means for simulating, due to movement of said means for simulating relative to or contact thereof with the rotating disk, or both; and
   means connected to said transducer means for selectively filtering said first signals to produce:
   second signals in a first frequency range in which spectral components of said first signals are indicative of rigid body accelerations of said means for simulating;
   third signals in a second, usually higher frequency range in which spectral components of said first signals are indicative of contacts between the disk and the means for simulating; and
   fourth signals in a third frequency range between said first and second ranges, in which RMS spectral components of said first signals are indicative of the roughness of flight of said means for simulating over the surface of the disk,
   where the frequency ranges are determined by the geometry of particular slider/transducer assembly chosen.

2. An improved apparatus according to claim 1, wherein the disk is a magnetic recording disk and said means for simulating is a magnetic read-write head.

3. An improved apparatus according to claim 1, wherein said means for simulating comprises an outer surface which faces away from an associated disk during use, further comprising four of said transducer means mounted on said surface, two positioned at spaced locations near the leading edge of said surface during rotation of a disk adjacent said means for simulating, and two positioned at spaced locations near the trailing edge of said surface during said rotation, whereby accelerations indicative of roll and pitch of said means for simulating can be detected.

4. An apparatus according to claim 1, wherein said means for simulating comprises an outer surface which faces away from an associated disk during use and there are two of said transducer means mounted on said surface, one positioned near the leading edge of said surface during rotation of a disk adjacent said means for simulating and one positioned near the trailing edge of said surface during said rotation, whereby accelerations indicative of pitch of said means for simulating can be detected.

5. An apparatus according to claim 1, wherein said transducer means has a first resonant frequency above the maximum frequency to be observed in said frequency ranges.

6. An improved apparatus for analyzing the interface between a recording disk and a read-write head in a recording system, comprising:
   transducer means for transforming mechanical movement of the head into representative electrical signals; and
   means for separating said signals into first and second spectral components representative of rigid body accelerations of the head and the roughness of the movement of the head over the surface of the disk.

7. Apparatus according to claim 6, wherein said means for separating also produces third spectral components representative of contacts between the head and the disk, the frequency of said third spectral components being higher than the frequency of said first and second spectral components.

8. Apparatus according to claim 6, further comprising means for digitally capturing and preserving said signals.

9. An improved apparatus according to claim 6, wherein the disk is a magnetic recording disk and the head is a magnetic read-write head.

10. An improved accelerometer for use in testing a recording disk to determine its quality, comprising:
    means for simulating the geometry, weight and material properties of a read-write head;
    at least one piezoelectric transducer means, mounted on said means for simulating, for producing signals in response to acceleration or flexure or both by said means for simulating, due to movement of said means for simulating relative to, or contact thereof with an associated recording disk, or both; and
    means for separating said signals into first and second spectral components representative of rigid body accelerations of the head and the roughness of the movement of the head over the surface of the disk.

11. An improved accelerometer according to claim 10, wherein said means for simulating comprises an outer surface which faces away from an associated disk during use and there are four of said transducer means mounted on said surface, two positioned at spaced locations near the leading edge of said surface during rotation of a disk adjacent said means for simulating and two positioned at spaced locations near the trailing edge of said surface during said rotation, whereby accelerations indicative of roll and pitch of said means for simulating can be detected.

12. An improved accelerometer according to claim 10, wherein the disk is a magnetic recording disk and said means for simulating is a magnetic read-write head.

13. An improved accelerometer according to claim 10, wherein said means for simulating comprises an outer surface which faces away from an associated disk during use and there are two of said transducer means mounted on said surface, one positioned near the leading edge of said surface during rotation of a disk adjacent said means for simulating and one positioned near the trailing edge of said surface during said rotation whereby accelerations indicative of pitch of said means for simulating can be detected.

14. An improved apparatus for analyzing the head-to-disk interface in a recording system, comprising:
    transducer means for transforming mechanical movements of the head into representative electrical signals;
    means for digitally capturing and preserving said electrical signals; and
    means for separating said signals into a plurality of spectral components representative of different physical characteristics of said movements.

15. An improved apparatus according to claim 14, further comprising means for determining the background level of said signals in each of said spectral components and means for measuring transient events, asperities and the like beyond said background level.

* * * * *